United States Patent Office 3,280,153
Patented Oct. 18, 1966

3,280,153
ESTERS CONTAINING BOTH EPOXIDE AND OXE-
TANE GROUPS, THEIR PRODUCTION AND
THEIR USES
Bernard Peter Stark, Stapleford, Cambridge, England, assignor to Ciba Limited, Basel, Switzerland, a company of Switzerland
No Drawing. Filed Oct. 8, 1962, Ser. No. 229,188
Claims priority, application Great Britain, Oct. 11, 1961, 36,527/61
4 Claims. (Cl. 260—348)

This invention relates to esters containing at least one epoxide group and at least one oxetane group, to processes for the production of such esters, and to the uses of such esters.

According to the present invention there are provided, as new chemical compounds, esters containing one or more epoxide groups and one or more oxetane rings (otherwise known as oxacyclobutane or trimethylene oxide rings) and having the general Formula I:

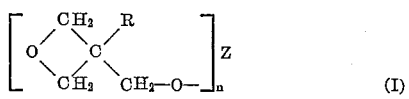
(I)

wherein R stands for an alkyl group, preferably a methyl or ethyl group, and Z stands for the residue of an organic compound, originally having $n$ carboxyl groups, that remains after the removal of hydroxyl groups from such carboxyl groups, $n$ being a small integer of value one or more, the residue Z containing at least one epoxide group.

The epoxy-octane esters of general Formula I are transparent compounds which are liquid at room temperature or readily fusible and which may be hardened, for example by treatment with an anhydride of a dicarboxylic acid, to yield clear, light-coloured, hardened (i.e. insoluble and infusible) products of very valuable technical properties.

According to a further feature of the invention, the esters of general Formula I may be readily obtained by the reaction of $n$ moles of a hydroxyoxetane of general Formula II:

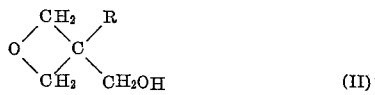
(II)

wherein R has the meaning assigned to it above, with one mole of an ester of Formula III:

[R'O—]$_n$Z        (III)

in which Z and $n$ have the meanings assigned to them above, and R' is a hydrocarbon residue, preferably an alkyl group possessing between one and four carbon atoms. This reaction, which may be represented by the equation:

(III)+$n$(II)⇌(I)+$n$(R'OH)

may be brought about by heating mixtures of the reactants of Formulae II and III, preferably in the presence of a transesterification catalyst which is not a strong acid. Such transesterification catalysts include, for example: tetraalkyl titanates such as tetrabutyl titanate, zinc acetate, cadmium acetate, dibutyltin oxide, and alkali metals and their hydroxides and alkoxides, quaternary ammonium hydroxides and quaternary ammonium hydroxide-containing ion-exchange resins such as those sold under the trade names Amberlite IRA–400 and IRA–401, Dowex, and De-Acidite FF. The transesterification reactions may be conducted in the absence of a solvent or in the presence of a suitable inert solvent, e.g., dioxane, toluene or chlorine-containing aromatic hydrocarbons, and are preferably conducted at a temperature within the range 20–200° C. If desired, the transesterification reactions may be carried out under reduced pressure, so that the alcohol R'OH produced according to the equation shown above is removed by distillation from the system. Alternatively, an excess of the hydroxyoxetane of Formula II may be present in the reaction mixture, its effect being to displace the equilibrium in favour of the desired bis- or poly-epoxyoxetane of Formula I. Subsequently, if desired, the transesterification catalyst may be removed or destroyed, and if considered necessary the excess of hydroxyoxetane may be removed, for example by distillation.

If the transesterification reaction, under practical conditions, does not proceed absolutely to completion, there may be left present in the final reaction product compounds having free hydroxy groupings and/or compounds conforming to the general Formula IV.

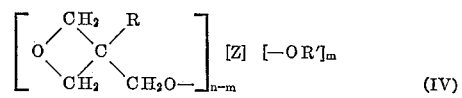
(IV)

wherein R, R' and Z and $n$ have the meanings assigned to them above, and $m$ is an integer of value less than $n$, It has been established that the presence of such by-products, as a rule, does not deleteriously affect, and may even favourably influence, the technical properties of the hardened epoxyoxetanes. Accordingly, it is generally unnecessary to isolate the pure epoxyoxetanes from the reaction mixture in which they are formed.

One preferred class of esters of Formula I is that which conforms to the Formula V:

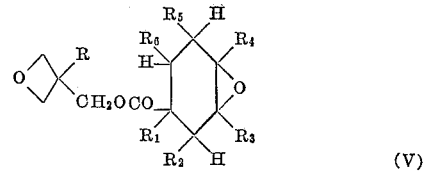
(V)

wherein R has the meaning assigned to it above, and $R_1$, $R_2$, $R_3$, $R_4$, $R_5$ and $R_6$ taken separately may each be hydrogen or an alkyl group, and where $R_2$ and $R_5$ taken together may represent an endomethylene group.

A second preferred class of esters of general Formula I is that which conforms to the general Formula VI:

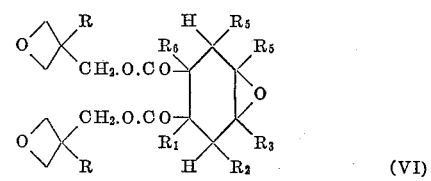
(VI)

wherein the various symbols have the meanings assigned to them above.

A third preferred class of epoxyoxetane esters of Formula I is that which conforms to the Formula VII:

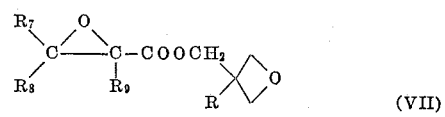
(VII)

wherein R has the meaning previously assigned to it, and where either $R_7$, $R_8$ and $R_9$ taken separately represent hydrogen atoms or aliphatic, cycloaliphatic, araliphatic or aromatic hydrocarbon residues, or $R_7$ and $R_8$ taken together represent a divalent saturated or unsaturated chain of atoms.

Still another preferred class of compounds conforming to the general Formula I is that which conforms to the Formula VIII:

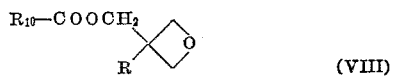
(VIII)

wherein R has the meaning previously assigned to it and $R_{10}$ represents a linear hydrocarbon residue containing between 10 and 24 carbon atoms and bearing at least one epoxide group, such epoxy groups not lying adjacent to the ester grouping of the compounds of Formula VIII. The residue $R_{10}COO-$ may thus represent a fragment of an epoxidised long-chain unsaturated fatty acid, such as epoxidised oleic, linoleic or linolenic acids, epoxidised mixtures of unsaturated naturally-occurring fatty acids such as epoxidised soya bean fatty acids, tung oil fatty acids, sesame oil fatty acids, sunflower seed oil fatty acids, rapeseed oil fatty acids, peanut oil fatty acids, olive oil fatty acids, castor oil fatty acids, coconut oil fatty acids, animal oil and tallow fatty acids, fish oil fatty acids and tall oil fatty acids.

The epoxyoxetane esters of Formula I may be crosslinked or hardened with those bis- or poly-functional compounds which are in general capable of reacting with epoxides and/or with oxetanes; alternatively or additionally, the esters of general Formula I may be polymerised by Friedel-Crafts catalysts such as $AlCl_3$, $SbCl_5$, $SnCl_4$, $ZnCl_2$ and $BF_3$ and their complexes with organic compounds. The preferred hardeners are polybasic acids and their anhydrides, e.g. phthalic acid, phthalic anhydride, methylendomethylenetetrahydrophthalic anhydride, endomethylenetetrahydrophthalic anhydride, dodecenylsuccinic anhydride, tetrahydrophthalic anhydride, hexahydrophthalic anhydride, maleic anhydride, succinic anhydride, hexachloroendomethylenetetrahydrophthalic anhydride, and adipic acid, or mixtures of such acids and anhydrides. In some cases accelerators for the hardening action may also be present; suitable accelerators are, for example, tertiary amines and/or strong acids such as toluene-p-sulphonic acid.

According to a further feature of the present invention, therefore, there are provided hardenable compositions which comprise one or more esters of general Formula I together with one or more hardening agents therefor, preferably anhydrides of di- or poly-carboxylic acids.

According to still other features of the invention, such hardenable mixtures may also contain a proportion of an ester of Formula IV, and may also or alternatively contain hydroxy-compounds such as hydroxyoxetanes of Formula II; in addition, other resins which are capable of reacting with the aforesaid hardeners or polymerisation catalysts may also be present in the compositions of this invention. These other resins include, in particular, bisoxetanes such as 2,6-dioxaspiro(3,3)heptane and reaction products of alkali metal salts of bisphenols with 3-halomethyl-3-alkyl-1-oxacyclobutanes, and also bis- and poly-epoxides such as di- or poly-glycidyl ethers of di- or polyalcohols or di- or poly-phenols such as bis(4-hydroxyphenyl)dimethylmethane, polyglycidyl esters of polycarboxylic acids, aminopolyepoxides such as are, for example, obtained by dehydrohalogenation of the reaction products from epihalohydrins and primary or secondary amines, and alicyclic compounds which bear epoxide groupings.

The compositions of this invention may also contain fillers, plasticizers, or colouring agents, for example asphalt, bitumen, glass fibres, mica, quartz powder, cellulose, kaolin, finely-divided silica such as that available under the trade name "Aerosil," kieselguhr, or metal powder.

The aforesaid compositions may be used in the filled or unfilled state, e.g. in the form of solutions or emulsions, as textile auxiliaries, laminating resins, varnishes, lacquers, dipping resins, casting resins, and encapsulating, coating, filling and packing materials, moulding materials, adhesives and the like, as well as for the preparation of such materials.

The following examples will serve to illustrate the invention. In these examples percentages are by weight and temperatures are in degrees centigrade.

*Example I*

Methyl 3,4-epoxy-1,2,5,6-tetrahydrobenzoate (31.2 gm., 0.2 mole) was mixed with 3-ethyl-3-hydroxymethyl-1-oxacyclobutane (23.2 gm., 0.2 mole), and with tetrabutyl titanate (1 gm.) as transesterification catalyst. The mixture was heated at 100–120° during 22 hours, the pressure being reduced gradually during this time to a value of 15 mm. Hg. The desired crude epoxy-oxetane ester was obtained as a pale yellow liquid of low viscosity, in a yield of 48.0 gm.

Maleic anhydride (6.6 gm.) was dissolved in 8 gm. of this material, and the mixture was heated at 140°; it gelled after ca. 10 minutes, and after 4 hours a pale brown insoluble and infusible hardened resin was obtained.

Examination of the undistilled material described above, by the method of infra-red spectroscopy, demonstrated that this substance was indeed an epoxy-oxetane. The spectrum had strong bands at ca. 1720 cm.$^{-1}$ (ester carbonyl group), ca. 980 cm.$^{-1}$ (oxetane group) and ca. 796 cm.$^{-1}$ (epoxide group fused to a cyclohexane ring); a weak band at ca. 3400 cm.$^{-1}$ indicated the presence of a small amount of hydroxylic impurity.

*Example II*

Ethyl β-phenyl-β-methylglycidate (41.2 gm., 0.2 mole) was mixed with 3-ethyl-3-hydroxymethyl-1-oxacyclobutane (23.2 gm., 0.2 mole) and tetrabutyl titanate (1 gm.), and the mixture was heated at 150° as described in Example I. Ethanol distilled off, and the residual material (a brown oil, 55.6 gm.) was found to have an infra-red spectrum which was almost identical with that of the initial ethyl β-phenyl-β-methylglycidate, except that a strong oxetane band at ca. 980 cm.$^{-1}$ was present in the product; this indicated that the product was essentially the desired epoxy-oxetane ester, and that the transesterification had proceeded without significant destruction of the glycidic ester moiety.

*Example III*

The epoxidised ethyl ester of tall oil fatty acid (21.4 gm.) was mixed with 3-ethyl-3-hydroxymethyl-1-oxacyclobutane (7.3 gm.) and with tetrabutyl titanate (0.3 gm.), and the mixture was heated for 4 hours at 150–140°, the pressure being gradually reduced to 15 mm. Hg. Ethanol distilled off, and the product (25.3 gm.) was obtained as a fluid yellow liquid.

*Example IV*

Di-n-propyl Δ$^4$-tetrahydrophthalate (50.8 gm.) was epoxidised by treatment with a 35% solution of peracetic acid in acetic acid (46.5 gm.), in the presence of sodium acetate (7 gm.) and chloroform (100 ml.). The mixture was kept at 40° C. for 3 hours, and was then neutralized with calcium carbonate, filtered, and the filtrate was washed with water (3 x 120 ml.), ethyl acetate being added to reduce emulsion formation. The organic solution was then washed with aqueous ferrous sulphate solution to remove peroxidic contaminants, and was then dried over magnesium sulphate, filtered and the solvent was evaporated from the filtrate to yield the corresponding epoxy-ester (i.e. crude di-n-propyl 7-oxabicyclo [4,1,0$^{1,6}$]heptane-dicarboxylate (54.3 gm.) as a cloudy oil having an epoxy value of 3.10 epoxy equiv. per kgm., when determined by titration with HBr in acetic acid solution.

This epoxy-ester (54.0 gm.) was treated with a solution of sodium hydroxide (0.5 gm.) in 3-ethyl-3-hydroxymethyl-1-oxacyclobutane (51.0 gm.), and the mixture was heated at 90° C. under such reduced pressure that propanol distilled from the reaction mixture. Finally, the mixture was heated at 100° C. and 0.1 mm. Hg pressure.

The residual material was cooled and dissolved in a mixture of benzene and ethyl acetate, and the solution was washed with water (2 x 100 ml.), dried over magnesium sulphate, and then filtered. Evaporation of solvents under reduced pressure from the filtrate gave the crude desired epoxybisoxetane ester as a yellow very viscous oil. Titration of this material with HBr in acetic acid indicated an epoxy value of 2.08 epoxy equiv./kgm., and the infra-red spectrum showed a strong band at ca. 980 cm.$^{-1}$, but only a weak band at ca. 3450 cm.$^{-1}$; this indicated that the product contained oxetane groupings but only small quantities of hydroxylic impurities.

Phthalic anhydride (9.7 gm.) was dissolved in the product (10 gm.) by warming, and the product was heated for 24 hours at 140° C.; a pale yellow infusible insoluble solid was obtained.

What is claimed is:

1. The compound of the formula

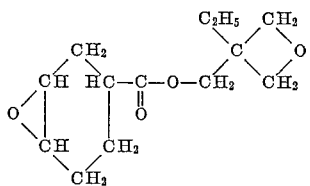

2. The compound of the formula

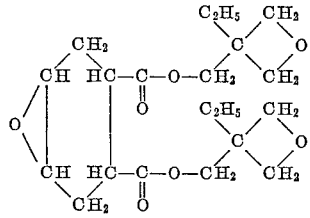

3. The compound of the formula

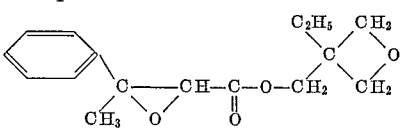

4. The compound of the formula

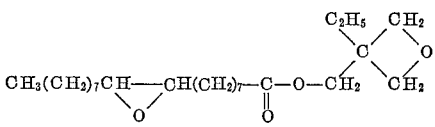

References Cited by the Examiner

UNITED STATES PATENTS

| 2,799,708 | 7/1957 | Oakley et al. | |
| 2,856,370 | 10/1958 | Muetterties | 260—2 |
| 3,027,352 | 3/1962 | Walling. | |
| 3,093,660 | 6/1963 | Aftandilian | 260—348 X |
| 3,105,838 | 10/1963 | Lusking | 260—333 |

FOREIGN PATENTS

| 863,446 | 3/1961 | Great Britain. |
| 877,134 | 9/1961 | Great Britain. |

OTHER REFERENCES

Bergmann, The Chemistry of Acetylene and Related Compounds, p. 80 (1948), QD 305 H8 B44.

Maerker et al., J. Org. Chem., vol. 26, p. 2681 (1961).

Richter's Organic Chemistry, vol. IV (1947), pp. 3–5, 12 and 13.

Wheland Advanced Organic Chemistry, 2d ed., page 373 (1949).

WALTER A. MODANCE, *Primary Examiner.*

NICHOLAS S. RIZZO, *Examiner.*

D. M. KERR, N. S. MILESTONE, *Assistant Examiners.*